Patented Feb. 25, 1947

2,416,480

UNITED STATES PATENT OFFICE 2,416,480

ELECTRICAL BRUSH

Albert C. Henry and Joseph L. Bitonte, Ironton, Ohio, assignors to Henrite Products Corporation, Ironton, Ohio, a corporation of Ohio No Drawing. Application August 19, 1943, Serial No. 499,226

3 Claims. (Cl. 171—325)

This invention relates, generally, to brushes and contacts for electrical machines, generators, motors and the like, and to the method of producing the same, and more particularly to a brush or contact the conductive constituent or constituents of which are bonded by a thermosetting synthetic resin of the aminotriazine resin class.

It is an object of this invention to produce an electrical brush, the electrically conductive constituent or constituents of which are bonded by a synthetic resin binder of the amino-triazine resin class, such as melamine resin, which is well known to the art as melamine reacted with an aldehyde or ketone, whereby the following advantages, both in the process of brush production and the performance of the brush in use, are obtained:

(1) Both the electrically conductive constituents and the melamine resin binder may be mixed as dry powders and then molded; such mixes involving considerable economy of time and labor in the mixing operations.

(2) The mix of electrically conductive material and melamine resin binder may be molded at lower temperatures (e. g., from 190 to 290 degrees F.) and with less pressure than is the case with other resin binders, thus providing additional factors of economy in production.

(3) Due to the comparatively low molding temperature required, the finished brush body retains more of the natural lubricating characteristics of the melamine resin binder; and consequently not only is the commutation efficiency of the finished brush greatly improved, but the durability or life of the same in use is substantially increased.

(4) Due to the fact that the melamine resin in unmolded state is a water soluble resin, it is very hygroscopic, possessing the ability to take up moisture from the atmosphere. Some of this moisture is incorporated with the resin crystals and will be trapped and held within the molded brush; and since water is a very good lubricant, the presence thereof within the brush tends to reduce the coefficient of friction of the brush in use, thus affording an additional factor in prolonging the life of the brush in use.

(5) Brushes in which the electrically conductive constituent or constituents are bonded with melamine resin are of better arc-resisting efficiency than brushes made with other types of binding resins, it appearing that the melamine resin per se possesses a high arc-resistance; as a consequence, the melamine bonded brushes give considerably better commutation in use with less sparking, and therefore with less risk of burning or like damage to the commutator face traversed thereby.

In the production of electrical brushes or the like, according to the instant invention, the electrically conductive constituent may optionally comprise any of the following materials alone or in various combinations, viz., graphite, copper, zinc, lead, tin, mercury, lampblack, carbon black or similar electrically conductive materials. Mixes of such or similar electrically conductive materials with melamine resin as a binder may be made with variously proportioned amounts of such conductive and binder constituents, according to the mechanical strength and specific resistance value desired to be attained in the brush body in any given case. Generally speaking, the amount of melamine resin binder may be varied from 1 to 50 per cent or more of the brush mix.

The following examples of mixes are given by way of illustration but not in limitation:

Example I

| | Parts |
|---|---|
| Melamine resin | 1 to 40 |
| Graphite or other electrically conductive material | 99 to 60 |

Example II

| | Parts |
|---|---|
| Melamine resin | 10 |
| Copper dust | 50 |
| Lead dust | 5 |
| Graphite | 35 |

The selected electrically conductive material or materials and the melamine resin binder are preferably reduced to powdered form and then intimately mixed together.

The powdered mix thus provided is deposited in suitable molds, and molded under pressure and heat; a temperature of 190 to 290 degrees F. being ordinarily sufficient to shape and cure the desired brush body.

The time required for curing may be reduced to a minimum by adding to the mix a small amount of a weak acid, preferably organic, such, e. g., as oxalic acid, phthalic acid, ethylene, glycol or the like. The acid is added to the mix in amounts preferably approximating 10 per cent, more or less, of the amount of melamine resin present. Thus e. g., if the mix comprises 15 per cent of the resin, the amount of acid added should preferably approximate 1.5 per cent. The presence of the acid substantially accelerates the curing process. It has been found that the curing time has thus been reduced to as little as one minute as compared with a curing time of five minutes required for brush mixes bonded with other kinds of resins. Not only is the curing time reduced by the acid, but the presence of the latter acts as an additional lubricant and further reduces the coefficient of friction of the brush in use.

Electrical brushes bonded with melamine resin are more water resistant after the curing thereof than are brushes bonded with other resins. It has been found that the melamine bonded brushes pick up less than 1 per cent of moisture when subjected to saturated air, whereas brushes bonded with other resins pick up from 3 to 5 percent under the same conditions. Ordinary carbon brushes pick up as much as 14 percent moisture. Brushes which pick up or absorb more than 2 per cent of moisture from the air tend to swell and "freeze" in the brush holders in use, with risk of causing considerable damage to the electrical machine served thereby. It will therefore be obvious that the water resistant characteristics of the novel melamine resin bonded brush of this invention are highly advantageous, in that such tendencies are substantially eliminated, and not only this, but their lubricating properties will tend to be more constant regardless of the amount of moisture in the surrounding air.

The melamine resin bonded brushes of this invention require but little heat treatment after molding and curing, and in fact perform quite satisfactorily without any heat treatment whatever. Where, however, heat treatment is desired, baking at a temperature of from 350 to 450 degrees F. for a period ranging from 4 to 24 hours is generally sufficient for the purpose, as compared with other resin bonded brushes, some of which require heat treatment for a period of as much as three months at a temperature running as high as 3500 degrees F.

It has been found that, owing to the qualities thereof as above set forth, the melamine resin bonded brush possesses a much longer brush life when used under high altitude conditions, as e. g. in electrical mechanisms employed in aircraft, when the latter fly at high altitudes.

Having described our invention, we claim:

1. An electrical brush comprising a mixture of a preponderance of electrically conductive material with a binder of thermosetting melamine resin.

2. An electrical brush comprising a mixture of powdered electrically conductive material and powdered melamine resin binding material adapted to be consolidated and cured by heat and pressure, wherein the resin constitutes from 1 to 50 per cent of the mixture.

3. An electrical brush comprising a mixture of a preponderance of a powdered electrically conductive material, powdered melamine resin binding material, and a relatively small amount of a weak acid, wherein the amount of acid approximates about 10 per cent of the amount of resin, said mixture being adapted to be consolidated and cured by heat and pressure.

ALBERT C. HENRY.
JOSEPH L. BITONTE.

REFERENCES CITED

The following references are of record in the file of this patent:

UNITED STATES PATENTS

| Number | Name | Date |
| --- | --- | --- |
| 1,037,901 | Hansen | Sept. 10, 1912 |
| 2,020,085 | Fuller | Nov. 5, 1935 |
| 2,199,803 | Light | May 7, 1940 |